Patented Aug. 11, 1925.

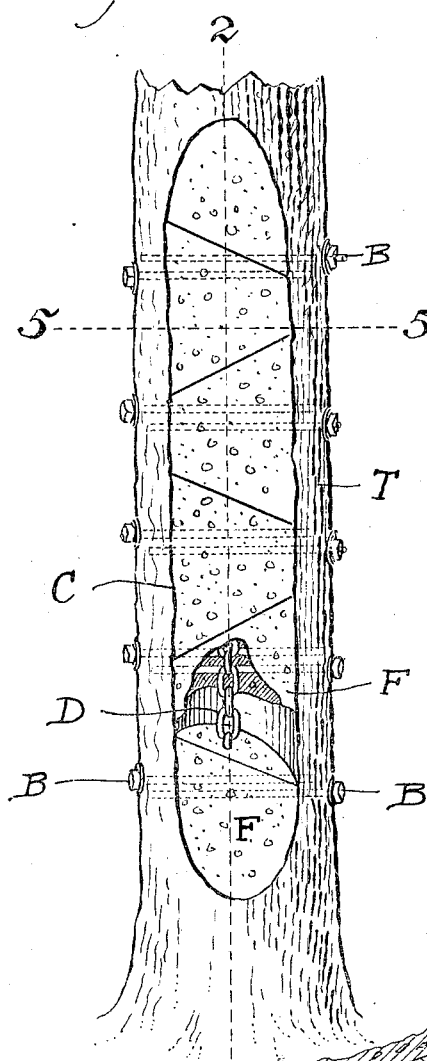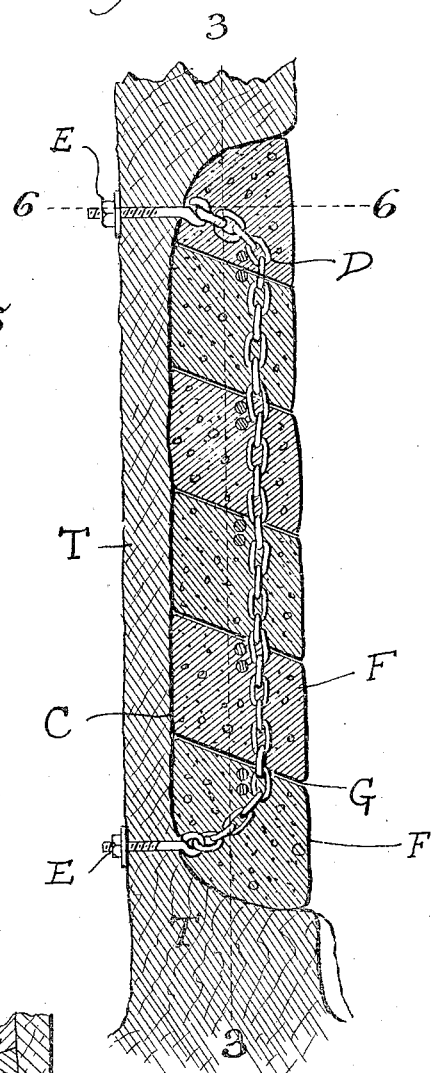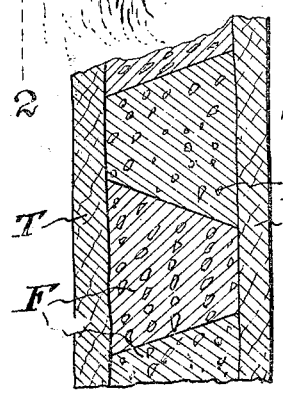

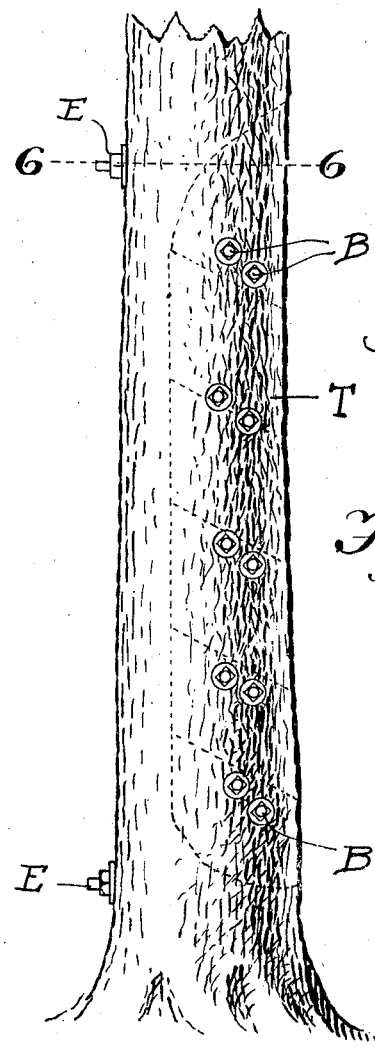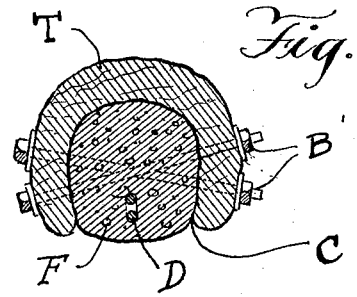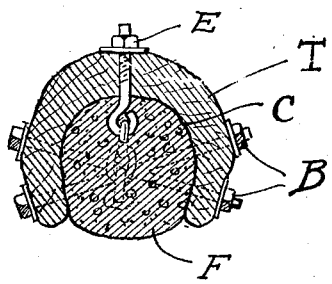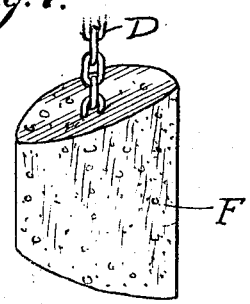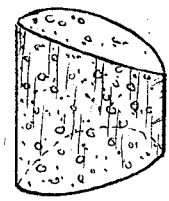

1,548,963

UNITED STATES PATENT OFFICE.

OSSIE H. TINDELL, OF FOUNTAIN CITY, TENNESSEE.

TREE SURGERY.

Application filed May 25, 1923. Serial No. 641,530.

*To all whom it may concern:*

Be it known that I, OSSIE H. TINDELL, a citizen of the United States, residing at Fountain City, in the county of Knox and State of Tennessee, have invented a new and useful Improvement in Tree Surgery, of which the following is a specification, reference being had to the accompanying drawing.

My improvement relates particularly to the treatment of cavities in living trees by the filling of said cavities with concrete or other suitable hard material adapted to exclude water and other extraneous matter and permit the growing or healing of live wood over the outer part of the cavity.

The object of my invention is to provide a method and means for easily treating such cavities in such manner as to preclude further decay and to facilitate growing of live wood over the cavity and to give stability to the weakened part of the tree while in the process of healing.

In the accompanying drawings,

Fig. 1 is an elevation of a part of a tree showing a cavity treated according to my improvement;

Fig. 2 is an upright section on the line 2—2, of Fig. 1, looking toward the right;

Fig. 3 is an upright section on a part of the line, 3—3, of Fig. 2, looking toward the left, the stay bolts being omitted;

Fig. 4 is a view of the same part of the tree, looking toward the right, as shown in Fig. 1;

Fig. 5 is a horizontal section on the line, 5—5, of Fig. 1;

Fig. 6 is a horizontal section on the line, 6—6, of Fig. 2;

Fig. 7 is a detached front view of one of the filling blocks;

Fig. 8 is another view of one of the filling blocks.

For convenience in description, the side of the tree trunk through which the cavity opens will be regarded as the front of the tree.

Referring to said drawings, T is the body of the tree, and C is a cavity opening at the front of the tree.

Preparatory to the filling of the cavity, decayed wood is removed from the cavity. Then the remaining inner faces of the cavity are disinfected or sterilized by the use of any well known material adapted to this purpose.

Then bolts, B, are placed horizontally to extend through the side walls or lips of the cavity. In the drawings, these bolts are shown arranged in pairs, the bolts of each pair crossing each other so that one end of each bolt penetrates one lip or side wall close to its edge and penetrates the other lip rearward of its edge. These pairs of bolts are separated from each other such distances as may be deemed desirable under the conditions found in the tree which is to be treated.

A chain, D, is placed upright in front of and against the bolts, B, approximately at the middle of the width of the cavity. Above the upper bolts, B, the upper end of the chain is turned rearward and coupled to the eye of an eye-bolt, E, which extends horizontally through the rear wall of the cavity. In a similar manner, the lower end of the chain is turned rearward below the lower bolts, B, and joined to the eye of an eye-bolt, E, which extends horizontally through the rear wall of the cavity.

The cavity is now ready to receive the concrete mixture which is to form the lowermost block, F. Said mixture is inserted and trimmed to the desired curvature at the front, and its upper part is trimmed to form a face which is inclined forward and also sidewise. Said mass of mixture when thus formed surrounds the lower part of the chain, D, and one pair of bolts, B, if said bolts are placed as low as shown in the drawings. Next paper, G, is laid on the upper face of said block, F, the paper surrounding the chain. The function of said paper is to form a separation or joint between the first block, F, and the second block, F.

Next concrete mixture is inserted upon said paper to form a mass which will constitute the second block, F. The front face of this mass is properly trimmed to give it the desired form, and the upper part is trimmed to form an upper face which slants or inclines forward and also sidewise but with its sidewise inclination opposed to the sidewise inclination of the upper face of the lowermost block. Thus the second block, F, is given a short upright edge on one side of the cavity and a long upright edge at the other side. In other words, with reference to an upright plane cutting the trunk of the tree parallel to the front, said second filling block is wedge-form.

Now paper, G, is placed on the upper face of the second block.

Then a third block is similarly formed on the second block, its upper face being formed to incline forward and sidewise, the sidewise inclination being in the direction opposite the direction of the sidewise inclination of the upper face of the next lower block. Thus one block after another is inserted, until the upper end of the cavity is reached. There the filling is completed by inserting above the last completed block material which will fill the remaining part of the cavity with a block of such form as is required by the remaining part of the cavity.

When this filling has been completed in the manner described, all the blocks excepting the uppermost and the lowermost will be wedge-form. It will now be seen that lateral pressure on the filling by the lips or side walls of the cavity will not tend to separate said blocks at their meeting faces, but on account of the wedge-form of the blocks, will press said meeting faces closely upon each other. The force exerted by the pressure of the cavity wall upon the long side of one of the blocks will exceed the force exerted by the opposite wall on the shorter side of the same block. Hence that block will be forced in the direction of the shorter side. At the same time the adjacent wedge-form blocks will be forced in the opposite direction.

Thus during growth of the side walls of the cavity the pressure exerted by such growth will aid in maintaining the position of the blocks instead of causing such displacement of the blocks as will permit entrance of water or other extraneous material.

It is to be understood that the forward slant of the upper face of each block is to be sufficiently steep to prevent water from passing rearward between two blocks.

The number of bolts, B, may be varied according to the size of the cavity and the relative strength of the walls of the tree at each side of the cavity. If said walls are relatively thin and weak, a sufficient number of said bolts are to be used to give said walls stability during the period of healing. In deciding upon the number of such bolts to be used, consideration must also be given to the matter of staying the concrete blocks; for, during the healing process, the blocks as well as the adjacent walls must be held substantially stable.

But regarding the staying of the blocks, special attention is to be given to the function of the chain, D; for said chain engages all the blocks and in an effective way cooperates with the bolts, B, in holding the blocks.

A further function of the chain is to cooperate with the tree trunk any resisting strains caused by winds blowing against the front of the tree. In this connection, the chain tends to act as a substitute for the part of the tree wall which is absent at the front of the tree.

I claim as my invention,

1. The herein described method of treating a cavity in a tree, which method consists in cleaning and sterilizing said cavity, then forming blocks of concrete in said cavity for filling the latter, the faces of which blocks slant forward and sidewise, the sidewise slant of said faces being alternately in opposite directions, substantially as described.

2. The herein described method of treating a cavity in a tree, which method consists in cleaning and sterilizing said cavity, then forming blocks of concrete in said cavity for filling the latter, sheet-form material being placed between the blocks and the faces of the blocks slanting forward and sidewise, the sidewise slant of said faces being alternately in opposite directions, substantially as described.

3. The herein described method of treating a cavity in a tree, which method consists in cleaning and sterilizing said cavity, then placing staying means into said cavity, then forming blocks of concrete in said cavity for filling the latter, the faces of which blocks slant forward and sidewise, the sidewise slant of said faces being alternately in opposite directions, substantially as described.

4. The herein described method of treating a cavity in a tree, which method consists in cleaning and sterilizing said cavity, then placing a chain upright in said cavity and securing its ends, then forming blocks of concrete in said cavity for filling the latter, the faces of which blocks slant forward and sidewise, the sidewise slant of said faces being alternately in opposite directions, substantially as described.

5. The herein described method of treating a cavity in a tree, which method consists in cleaning and sterilizing said cavity, then placing a chain upright and bolts transversely in said cavity, then forming blocks of concrete in said cavity for filling the latter, the faces of which blocks slant forward and sidewise, the sidewise slant of said faces being alternately in opposite directions, substantially as described.

In testimony whereof I have signed my name this 22nd day of May, in the year one thousand nine hundred and twenty-three.

OSSIE H. TINDELL.